(12) United States Patent
Kapoor

(10) Patent No.: US 9,858,602 B2
(45) Date of Patent: Jan. 2, 2018

(54) LEARNER BILLING IN A MODULAR LEARNING SYSTEM

(75) Inventor: Samridh Kapoor, Mumbai (IN)

(73) Assignees: MONK AKARSHALA DESIGN PRIVATE LIMITED, Mumbai (IN); MONK AKARSHALA INC., Sacramento, CA (US)

( * ) Notice: Subject to any disclaimer, the term of this patent is extended or adjusted under 35 U.S.C. 154(b) by 0 days.

(21) Appl. No.: 14/344,439

(22) PCT Filed: Sep. 13, 2012

(86) PCT No.: PCT/US2012/054959
§ 371 (c)(1),
(2), (4) Date: Mar. 12, 2014

(87) PCT Pub. No.: WO2013/040106
PCT Pub. Date: Mar. 21, 2013

(65) Prior Publication Data
US 2014/0344125 A1    Nov. 20, 2014

(30) Foreign Application Priority Data

Sep. 13, 2011 (IN) .......................... 2599/MUM/2011

(51) Int. Cl.
*G06Q 30/04* (2012.01)
*G06Q 20/14* (2012.01)
*G06Q 50/20* (2012.01)
G09B 3/00 (2006.01)

(52) U.S. Cl.
CPC ........... *G06Q 30/04* (2013.01); *G06Q 20/145* (2013.01); *G06Q 50/20* (2013.01)

(58) Field of Classification Search
CPC ...... G06Q 30/04; G06Q 20/102; G06Q 40/10; G06Q 40/02; G06Q 40/00
USPC .......................................................... 705/34
See application file for complete search history.

(56) References Cited

U.S. PATENT DOCUMENTS

| | | | |
|---|---|---|---|
| 6,845,229 B2 | 1/2005 | Notomi | |
| 7,558,853 B2 | 7/2009 | Alcorn et al. | |
| 2003/0222136 A1* | 12/2003 | Bolle | G06Q 20/06 235/379 |
| 2007/0122790 A1* | 5/2007 | Sperle | G09B 5/00 434/350 |
| 2008/0050715 A1 | 2/2008 | Golczewski et al. | |
| 2008/0059371 A1 | 3/2008 | McAvoy et al. | |
| 2009/0305202 A1 | 12/2009 | Gorup et al. | |
| 2009/0311658 A1 | 12/2009 | Polivka | |
| 2011/0229864 A1* | 9/2011 | Short | G09B 7/00 434/219 |
| 2012/0054071 A1 | 3/2012 | Griffin et al. | |

\* cited by examiner

*Primary Examiner* — Garcia Ade
(74) *Attorney, Agent, or Firm* — Innovation Capital Law Group, LLP; Vic Lin

(57) ABSTRACT

A modular learning system provides billing for learning users who have engaged in a variety of learning services in the modular learning system. For example the learning user may engage in learning application purchases, performances, learning facility access, tutor access, and learning tool access. The purchase of these varieties of learning services are used to provide various billing items for each type of learning service. The learning service purchases are consolidated and offset by prepaid learning services as well as modified by any applicable taxes.

10 Claims, 11 Drawing Sheets

| Certification Metadata 302 | Scoring Metrics Metadata 304 |
|---|---|
| Language Metadata 306 | Performance Type Metadata 308 |
| Duration Metadata 310 | Subject Link/Tag Metadata 312 |
| Age Level Metadata 314 | Learning Facility Metadata 316 |
| Authoring Metadata 318 | Sequence Metadata 320 |
| Tool Metadata 322 | Mode Metadata 324 |
| Media Metadata 326 | Medium Metadata 328 |
| Job Skill Metadata 330 | Error Metadata 332 |
| Template Metadata 334 | Tutor Metadata 336 |

Learning Application 300

FIG. 3A

500A — Learner Bill

Name : Anamika 5  
Learner Registration No : LU12334

Bill Date : 30.6.11  
Due Date : 19.7.11

ACCOUNT SUMMARY 502

| Particulars | Units | Amount ₹ |
|---|---|---|
| Learning Applications 504 | 10 | 2243.84 |
| Tutor Access 506 | 13:27:12 | 3312.66 |
| Learning Facility Access 508 | 13:27:12 | 3312.66 |
| Learning Event Access 510 | 10 | 2243.84 |
| Tool Rental 512 | 13:27:12 | 3312.66 |
| Tools Purchased 514 | 10 | 2243.84 |
| Trial Performances 516 | 14 | 3263.76 |
| Service Usage 518 | 13:27:12 | 3312.66 |
| Learning Plans 520 | 1 | 5999.00 |
| Other adjustments 522 | | 0.00 |
| Total Before Tax | | 29244.92 |
| Tax 524 | | 3012.88 |
| Total 526 | | 32257.80 |

| Learning Application 504 ||||| 
|---|---|---|---|---|
| Learning Application Code | Transaction Date and Time | Units | Rate ₹ | Amount ₹ |
| SW001 | 25.6.11 13:55:56 | 1 | 40.80 | 40.80 |
| AC005 | 21.6.11 14:56:33 | 1 | 81.59 | 81.59 |
| PS105 | 15:6.11 07:11:44 | 1 | 122.39 | 122.39 |
| HI045 | 13.6.11 11:07:19 | 1 | 163.19 | 163.19 |
| CA088 | 11.6.11 15:54:17 | 1 | 203.93 | 203.93 |
| CH111 | 9.6.11 21:45:11 | 1 | 244.78 | 244.78 |
| AS145 | 7.6.11 14:51:56 | 1 | 285.53 | 285.53 |
| DE745 | 5.6.11 23:18:33 | 1 | 326.58 | 326.58 |
| BC043 | 3.6.11 17:24:22 | 1 | 367.17 | 367.17 |
| OC111 | 1.6.11 04:25:39 | 1 | 407.97 | 407.97 |
| | Total | | | 2243.84 |

| Tutor Access 506 | | | | | | | |
|---|---|---|---|---|---|---|---|
| Tutor Code | Learning Application Performances Monitored | Date | Login | Logout | Duration hh:mm:ss | Rate ₹/hr | Amount ₹ |
| IN002 | LA134, LA234, LA345 | 26.6.11 | 10:25:45 | 11:31:15 | 01:05:45 | 40.80 | 44.88 |
| IN0103 | LA135, LA246 | 21.6.11 | 15:11:36 | 17:23:47 | 02:12:11 | 81.59 | 187.66 |
| IN111 | LA147, LA258, LA369 | 15.6.11 | 14:25:08 | 14:40:37 | 00:15:29 | 122.39 | 36.67 |
| IN223 | LA111 | 13.6.11 | 09:16:26 | 10:34:23 | 01:17:58 | 163.19 | 48.96 |
| IN3242 | LA198, LA187 | 11.6.11 | 08:45:25 | 10:43:23 | 00:57:58 | 203.99 | 203.99 |
| IN1242 | LA145, LA156 | 9.6.11 | 18:58:00 | 19:22:01 | 00:24:01 | 244.78 | 122.39 |
| IN314 | LA188 | 7.6.11 | 21:01:19 | 21:30:47 | 00:29:28 | 285.58 | 142.79 |
| IN3214 | LA139, LA876 | 5.6.11 | 23:25:28 | 14:40:53 | 01:15:25 | 326.38 | 424.29 |
| IN1231 | LA876, LA346, LA227 | 3.6.11 | 17:25:37 | 20:54:35 | 03:28:58 | 367.17 | 1285.10 |
| IN1333 | LA247, LA309 | 1.6.11 | 11:28:49 | 13:28:48 | 01:59:59 | 407.97 | 815.94 |
| | Total | | | | | | 3312.66 |

| Learning Facility Access 508 | | | | | | | |
|---|---|---|---|---|---|---|---|
| Learning Facility Code | Learning Applications Performed | Date | Login | Logout | Duration hh:mm:ss | Rate ₹/hr | Amount ₹ |
| INMH10 | LA123, LA234, LA345 | 26.6.11 | 10:25:45 | 11:31:15 | 01:05:45 | 40.80 | 44.88 |
| INMH22 | LA135, LA246 | 21.6.11 | 15:11:36 | 17:23:47 | 02:12:11 | 81.59 | 187.66 |
| INMH01 | LA147, LA258, LA359 | 15.6.11 | 14:25:08 | 14:40:37 | 00:15:29 | 122.39 | 36.67 |
| INMH06 | LA111 | 13.6.11 | 09:16:25 | 10:34:23 | 01:17:58 | 163.19 | 48.96 |
| INMH07 | LA198, LA187 | 11.6.11 | 08:45:25 | 10:43:23 | 00:57:58 | 203.99 | 203.99 |
| INMH07 | LA145, LA156 | 9.6.11 | 18:58:00 | 19:22:01 | 00:24:01 | 244.78 | 122.39 |
| INMH07 | LA188 | 7.6.11 | 21:01:19 | 21:30:47 | 00:29:28 | 285.58 | 142.79 |
| INMH07 | LA139, LA876 | 5.6.11 | 23:25:28 | 14:40:53 | 01:15:25 | 326.38 | 424.29 |
| INMH01 | LA876, LA346, LA227 | 3.6.11 | 17:25:37 | 20:54:35 | 03:28:58 | 367.17 | 1285.10 |
| INMH01 | LA247, LA309 | 1.6.11 | 11:28:49 | 13:28:48 | 01:59:59 | 407.97 | 815.94 |
| | Total | | | | | | 3312.66 |

| Microlearning Event Access 510 | | | | |
|---|---|---|---|---|
| Microlearning Event Code | Learning Applications Performed | Units | Rate ₹/hr | Amount ₹ |
| | LA321, LA334, LA455, LA423, LA132, LA543 | 1 | | |
| PSYEXCIND020 | LA356, LA095, LA875, LA473, LA654 | 1 | 40.80 | 40.80 |
| SWIEXCSUI001 | LA234, LA876, LA307 | 1 | 81.59 | 81.59 |
| ACFLDUS005 | LA133, LA222, LA534, LA765, LA342, LA223 | 1 | 122.39 | 122.39 |
| PHYFLDN105 | LA333, LA155, LA565, LA444 | 1 | 163.19 | 163.19 |
| HISEXCLAT045 | LA786, LA986, LA999, 651, 505 | 1 | 203.99 | 203.99 |
| CALEXCNED088 | LA100, LA380, LA400, LA186 | 1 | 244.78 | 244.78 |
| CRIEXCUK111 | LA194, LA183, LA200, LA189, LA188 | 1 | 285.58 | 285.58 |
| ASTFLDIND145 | LA876, LA175, LA156 | 1 | 326.38 | 326.38 |
| DESINDIND745 | LA319, LA334, LA357, LA281 | 1 | 367.17 | 367.17 |
| BOTFLDCOS048 | LA777, LA007, LA117, LA987, LA457, LA337 | | 407.97 | 407.97 |
| | Total | | | 2243.84 |

| Tool Rental 512 | | | | | | |
|---|---|---|---|---|---|---|
| Tool Code | Learning Application Code | Date | Start Time | End Time | Duration hh:mm:ss | Rate ₹/hr | Amount ₹ |
| SWMR001 | LA112 | 25.6.11 | 10:25:45 | 11:31:15 | 01:05:45 | 40.80 | 44.88 |
| ACCR005 | LA344 | 21.6.11 | 15:11:36 | 17:23:47 | 02:12:11 | 81.59 | 187.66 |
| PSYR105 | LA987 | 15.6.11 | 14:25:08 | 14:40:37 | 00:15:29 | 122.39 | 36.67 |
| HISR045 | LA634 | 13.6.11 | 09:16:26 | 10:34:23 | 01:17:58 | 163.19 | 48.96 |
| CAL088 | LA556 | 11.6.11 | 08:45:25 | 10:43:23 | 00:57:58 | 203.99 | 203.99 |
| CRIR111 | LA542 | 9.6.11 | 18:58:00 | 19:22:01 | 00:24:01 | 244.78 | 122.39 |
| ASTR145 | LA876 | 7.6.11 | 21:01:19 | 21:30:47 | 00:29:28 | 285.58 | 142.79 |
| DESR745 | LA456 | 5.6.11 | 23:25:28 | 14:40:53 | 01:15:25 | 326.38 | 424.29 |
| BOTR048 | LA113 | 3.6.11 | 17:25:37 | 20:54:35 | 03:28:58 | 367.17 | 1285.10 |
| OCHR111 | LA977 | 1.6.11 | 11:28:49 | 13:28:48 | 01:59:59 | 407.97 | 815.94 |
| | | | Total | | | | 3312.66 |

| Tools Purchase 514 | | | | | |
|---|---|---|---|---|---|
| Tool Code | Learning Application Code | Tool | Quantity | Rate ₹ | Amount ₹ |
| SWMR001 | LA113 | Swimming Goggles | 1 | 40.80 | 40.80 |
| ACCP005 | LA345 | Taly ERP | 1 | 81.59 | 81.59 |
| PSYP105 | LA988 | Rorschach inkblot test | 1 | 122.39 | 122.39 |
| HIRSP045 | LA635 | World War 2 Memorabilia | 1 | 163.19 | 163.19 |
| CALP088 | LA557 | Caligraphy Pens | 1 | 203.99 | 203.99 |
| CRIP111 | LA543 | Cricket Bat | 1 | 244.78 | 244.78 |
| ASTP145 | LA877 | Telescope | 1 | 285.58 | 285.58 |
| DESP745 | LA457 | Adobe Photoshop CS3 | 1 | 326.38 | 326.38 |
| BOTP048 | LA114 | Microscope | 1 | 367.17 | 367.17 |
| OCHP111 | LA978 | Ethanol | 1 | 407.97 | 407.97 |
| | | Total | | | 2243.84 |

| Trial Performance 516 | | | | | | |
|---|---|---|---|---|---|---|
| Test Code | Learning Application Code | Transaction Date and Time | | | Units | Rate ₹ | Amount ₹ |
| | | Trial Performance 1 | Trial Performance 2 | | | | |
| TI001 | SW001 | 26.6.11 13:55:56 | | | 1 | 40.80 | 40.80 |
| TI006 | AC005 | 27.6.11 14:56:33 | 29.6.11 14:56:33 | | 2 | 81.59 | 163.19 |
| TI045 | PS105 | 16.6.11 07:11:44 | | | 1 | 122.39 | 122.39 |
| TI666 | HI045 | 14.6.11 11:07:19 | | | 1 | 163.19 | 163.19 |
| TI763 | CA088 | 12.6.11 15:54:17 | 18.6.11 15:54:17 | | 2 | 203.99 | 407.97 |
| TI790 | CR111 | 10.6.11 21:45:11 | | | 1 | 244.78 | 244.78 |
| TI890 | AS145 | 8.6.11 14:51:46 | | | 1 | 285.58 | 285.58 |
| TI915 | DE745 | 6.6.11 23:18:33 | 9.6.11 23:18:33 | | 2 | 326.38 | 632.75 |
| TI933 | BO048 | 4.6.11 17:24:22 | | | 1 | 367.17 | 367.17 |
| TI978 | OC111 | 2.6.11 04:25:39 | 9.6.11 04.25.39 | | 2 | 407.97 | 814.94 |
| | | Total | | | | | 3263.76 |

| Service Usage 518 | | | | | |
|---|---|---|---|---|---|
| Date | Login/ Checkin | Logout/ Checkout | Duration hh:mm:ss | Rate ₹/hr[4] | *Amount* ₹ |
| 26.6.11 | 10:25:45 | 11:31:15 | 01:05:45 | 40.80 | 44.88 |
| 21.6.11 | 15:11:36 | 17:23:47 | 02:12:11 | 81.59 | 187.66 |
| 15.6.11 | 14:25:08 | 14:40:37 | 00:15:29 | 122.39 | 36.67 |
| 13.6.11 | 09:16:26 | 10:34:23 | 01:17:58 | 163.19 | 48.96 |
| 11.6.11 | 08:45:25 | 10:43:23 | 00:57:58 | 203.99 | 203.99 |
| 9.6.11 | 18:58:00 | 19:22:01 | 00:24:01 | 244.78 | 122.39 |
| 7.6.11 | 21:01:19 | 21:30:47 | 00:29:28 | 285.58 | 142.79 |
| 5.6.11 | 23:25:28 | 14:40:53 | 01:15:25 | 326.38 | 424.29 |
| 3.6.11 | 17:25:37 | 20:54:35 | 03:28:58 | 367.17 | 1285.10 |
| 1.6.11 | 11:28:49 | 13:28:48 | 01:59:59 | 407.97 | 815.94 |
| Total | | | | | 3312.66 |

| Learning Plans 520 | |
|---|---|
| Details | *Amount* ₹ |
| Corporate Law Learning Plan | 5999.00 |
| Less: Learning Plan Adjustments | 0.00 |
| Total | 5999.00 |

| Other Adjustments 522 | |
|---|---|
| Details | *Amount* ₹ |
| NIL | |
| Total | 0.00 |

| Tax 524 | |
|---|---|
| | *Amount* ₹ |
| Service Tax | 3012.88 |
| Total | 3012.88 |

*Learning Pulse 6 minutes

FIG. 5D

LEARNER BILLING IN A MODULAR LEARNING SYSTEM

CROSS REFERENCE TO RELATED APPLICATIONS

This application is a U.S. National Stage of International Application No. PCT/US2012/054959, filed Sep. 13, 2012, which claims the benefit of Indian Provisional Specification No. 2599/MUM/2011, titled "Learner Billing in a Modular Learning System" filed on Sep. 13, 2011, both of which are incorporated by reference herein in their entireties.

FIELD OF THE ART

The present invention relates generally to modular learning systems, and more particularly to learner billing systems and methods in a modular learning system.

DESCRIPTION OF THE RELATED ART

The current education environment includes members like students or learners, teachers, tutors, coaches, guides, professors or lecturers, content authors, and organizational members like preschools, schools, colleges, universities, educational boards and professional standards authorities, admission testing authorities, placement organizations, recruiters, HR departments of organizations, educational content and media publishers and local, regional, and national governments. All the above maintain some form of transactional and functional relationships with each other. A variety of members in the traditional education environment like tutors, coaches, preschools, schools, colleges, universities, educational boards, professional standards authorities, admission testing authorities, educational content and media publishers, educational counsellors or local, regional, and national governments may charge and bill students separately and in a fragmented manner for a variety of educational products and services which are macro in nature and scope through items like admission fees, a quarterly or yearly tuition fee, a course, degree or program fee, a textbook purchase or rental fee, a testing or examination fee, or even informal methods like capitation fees, with each corresponding retailer generating a corresponding printed or electronic receipt or invoice for the same. Recently, modular learning systems enable a plurality of kinds of users to establish transactional and functional relationships with each other, and such users include a plurality of learning users, tutoring users, learning application authoring users, a plurality of kinds of learning facility administering users, a plurality of kinds of learning event organizing users as well as learning tool supplying users, in addition to a plurality of learning applications.

However, some modular learning systems, especially those offering the purchase and performance of discrete microlearning experiences may find it difficult to bill learning users purchasing microlearning purchase items on or through the modular learning system in the traditional manner employed by traditional educational product or service retailers like tutors, coaches, preschools, schools, colleges, universities, educational boards, professional standards authorities, admission testing authorities, educational content and media publishers, educational counsellors or local, regional, and national governments whose billing items are usually much more macro in nature and scope like admission fees, a quarterly or yearly tuition fee, a course, degree or program fee, a textbook purchase or rental fee, a testing or examination fee, or even informal methods like capitation fees. Further, such educational product and service retailers do not face the additional complexity of confirming the compatibility and service availability of each individual content or service module offered for such a fee with each student, or even with each other, as such decisions are currently made very broadly and manually in the traditional education environment.

SUMMARY

In an aspect, the present invention provides a method for learner billing in a modular learning system environment. Said method may comprise a plurality of steps like receiving a learner billing request from the billing cycle module, determining the billing cycle of a learning user, determining microlearning items purchased in last billing cycle, aggregating the amount or cost due from the learning user, determining activated learning plans, adjusting the amount or cost due based on an active learning plan, determining the prepaid balance of the learning user, updating the prepaid account balance of the learning user and displaying or printing cyclical learner bill.

In further aspect, the invention provides a system for learner billing in a modular learning system environment. The said system comprises a plurality of modules and generators like a purchase items module, a prepaid balance module, a service usage billing items module, a learning applications billing items module, a tutor access billing items module, an independent learning facility billing items module, an institutional learning facility billing items module, a workspace learning facility billing items module, a temporary learning facility billing items module, a learning visits billing items module, a learning workshops billing items module, a rental learning tools billing items module, a purchased learning tools billing items module, a learning plans billing items module, a modular tests billing items module, a tutorials/courses billing items module, another billing adjustments module, a local taxation module, an aggregation module, a billing cycle module, a learning plans adjustments module, a bill printing interface generator and a bill interface generator.

In final aspect the invention provides a non-transitory computer-readable storage medium having tangibly embodied thereon a program of instructions executable by a processor for executing steps comprising a plurality of steps like receiving a learner billing request from the billing cycle module, determining the billing cycle of a learning user, determining microlearning items purchased in last billing cycle, aggregating the amount due from the learning user, determining activated learning plans, adjusting the amount due based on an active learning plan, determining the prepaid balance of the learning user, updating the prepaid account balance of the learning user and displaying or printing cyclical learner bill.

These and other advantages, aspects and novel features of the present disclosure, as well as details of an illustrated embodiment thereof, will be more fully understood from the following description and drawings. It is to be understood that the foregoing general descriptions are examples and explanatory only and are not restrictive of the disclosure as claimed.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3A is a block diagram of a learning application according to one embodiment.

FIGS. 5A-5D is the learner bill interface generated by the learner billing module according to one embodiment.

DETAILED DESCRIPTION

Figure 1:
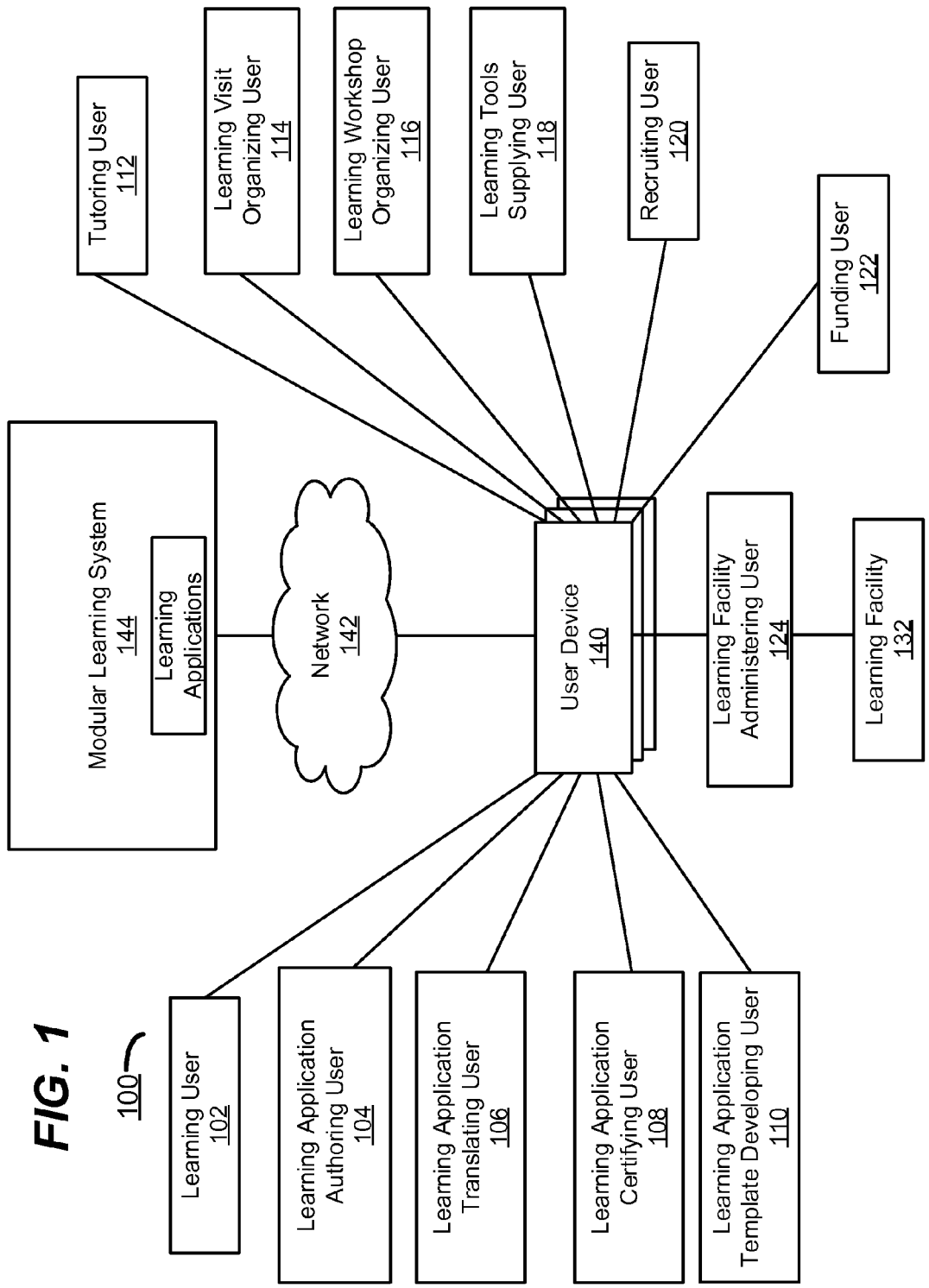
FIG. 1 is a modular learning environment including a modular learning system 144 according to one embodiment.

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method for learner billing in a modular learning system environment is provided. The learner billing module in the modular learning system 144 may comprise a plurality of modules and generators like a purchase items module, a prepaid balance module, a service usage billing items module, a learning applications billing items module, a tutor access billing items module, an independent learning facility billing items module, an institutional learning facility billing items module, a workspace learning facility billing items module, a temporary learning facility billing items module, a learning visits billing items module, a learning workshops billing items module, a rental learning tools billing items module, a purchased learning tools billing items module, a learning plans billing items module, a modular tests billing items module, a tutorials/courses billing items module, another billing adjustments module, a local taxation module, an aggregation module, a billing cycle module, a learning plans adjustments module, a bill printing interface generator and a bill interface generator. The method for learner billing in a modular learning system environment may comprise a plurality of steps like receiving a learner billing request from the billing cycle module, determining the billing cycle of a learning user, determining microlearning items purchased in last billing cycle, aggregating the amount or cost due from the learning user, determining activated learning plans, adjusting the amount or cost due based on an active learning plan, determining the prepaid balance of the learning user, updating the prepaid account balance of the learning user and displaying or printing cyclical learner bill with a remaining balance.

FIG. 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g. Breaststroke) or a group of learning applications (e.g. Breaststroke, Freestyle, Butterfly and Swimming Safety). Tutor access, such as access to a swimming instructor may be purchased in various increments, such as in hours. Learning content applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by the learning user, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning services as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning content applications, microlearning application templates, translation of microlearning content applications, certification of microlearning content applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. The tutoring user may provide tutoring to the learning user 102 by meeting the learning user 102 in person to assist the learning user 102 in performing the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning content application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning content application as a part of their respective curricula or syllabi and manages the sale of such certification services to learning content application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g. Breaststroke) compatible with the learning infrastructure (e.g. Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g. sulphuric acid or swimming goggles) or access to the same in micro increments of time and money ($six/hour or $five/learning application performance) depending on multiple factors like the learning infrastructure to be accessed (e.g. Swimming Pool, Computers, Chemistry Lab), number of hours of access, and the like, through an interface displayed on a user device 140.

The modular learning system 144 enables an administrator 124 of an institutional learning facility like a preschool, school, college or university (e.g. Bangalore University) associated, partnered or linked with the modular learning system 144 to, in addition to managing the sale associated with the independent learning facility (e.g. learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g. learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g. a Cricket Ground available for net practice on Saturdays and Sundays from six in the morning to twelve in the midnight) to, in addition to managing the sale associated with the independent learning facility (e.g. learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g. chemistry equipment, computers, cricket stumps) as well as learning tools, aids and materials (e.g. sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g. personal computer), a network (e.g. internet, intranet, world wide web), learning facilities (e.g. an Independent Learning Facility, an Institutional Learning Facility), it would be appreciated by one skilled in the art that fewer or more kinds of users (e.g. a Learning Application Fact Checking User, a Web Based Offsite Tutoring User), user devices (e.g. a mobile phone device, a portable gaming console device, a tablet device, a learning console device, gaming console device or server device attached to a television or other screen), networks (e.g. an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
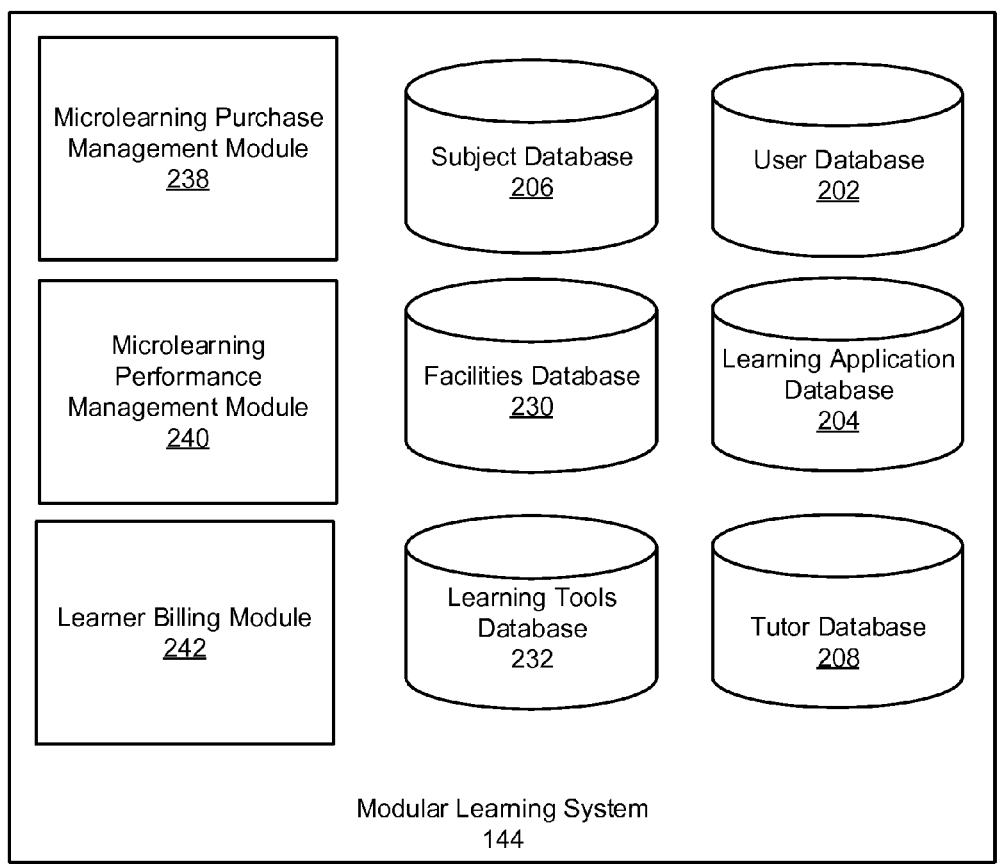
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by performance management module 240. Additional modules of the modular learning system 144 are described below.

A user database 202 is configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to learning facility 132, timed access to tutor 112, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, learning facility administering users, and other types of users of the modular learning system 144.

In one embodiment, a distinct Learning User Database is configured for receiving, storing, updating and retrieving a plurality of data fields of each learning user 102, comprising the learning user's name, address, contact details as well as learning related data fields like learning history outside the modular learning system 144, learning application performance history on the modular learning system 144, purchase history of learning applications as well as purchase history of a host of related microlearning purchase items like, for example, access to learning facility 132, access to tutor 112, and purchase of access to an learning tool. In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose purchase is managed through the module 238. Optionally, all purchase related metadata of the learning application, like number of copies accessed per day, segmented by location, language, learning facility, user device, as well as other learning related purchase analytics metadata that may be generated during the purchase process may be received, stored, and updated by the microlearning purchase management module in the learning application database 204.

In one embodiment, the database 204 is configured for receiving, storing, updating and retrieving all the learning application metadata of all learning applications whose performance is managed through the module 240. Optionally, all performance related metadata of the learning application, like number of copies performed per day, segmented by location, language, learning facility, user device, as well as other learning related performance analytics metadata that may be generated during the performance process may be received, stored, and updated by the microlearning performance management module in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facility database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged thirty to forty, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A learner billing module 242 is configured for generating and managing learner bills in a modular learning system.

In one embodiment, the tutor database, learning facilities database, tools database and other application services databases form a single consolidated application services database in modular learning system 144.

Although the modular learning system 144 is described as being composed of various modules like databases and modules, the modular learning system 144 may comprise fewer or more databases, components, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, and a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g. tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144.

For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, 232 modules 238, 240 and 242 as well as the databases, engines, modules and components of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, and 232, modules 238, 240 and 242 as well as the databases, engines, modules and components of the above embodiments may be implemented in the modular learning system in the form of an apparatus configured to perform one or more embodiments disclosed herein.

FIG. 3 is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is used to receive, store, retrieve, display and update certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is used to receive, store, retrieve, display and update a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is used to receive, store, retrieve, display and update a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316 authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is used to receive, store, retrieve, display and update the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred meter Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is used to receive, store, retrieve, display and update the suggested duration of the learning application 300. In some embodiments, the metadata 310 indicates a fixed duration like, 15 minutes, or 30 minutes, or 1 hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is used to receive, store, retrieve, display and update a plurality of subject links and tags attached to the learning application 300 by the learning content application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is used to receive, store, retrieve, display and update the suggested age level of the learning user 102 for performance of the learning application 300. In some embodiments, the age level is set as a minimum suggested age say, for example, 10+ by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is used to receive, store, retrieve, display and update the suggested learning infrastructure required in a learning facility for performance of the learning application 300. In some embodiments, such learning facilities and infrastructure (e.g. Olympic Sized Swimming Pool) required for the performance of the learning application (e.g. eight hundred meter Freestyle to Olympic Guidelines) is received and updated by the learning application authoring user 104 by picking the same from a learning facility database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is used to receive, store, retrieve, display and update the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning content application. In some embodiments, the metadata may also include citations to other learning content applications or other learning content application authoring users made by the user 104.

The Sequence Metadata 320 is used to receive, store, retrieve, display and update the suggested sequence of performance of the learning application 300 relative to another learning application. The sequence metadata may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is used to receive, store, retrieve, display and update the compatible tools or learning materials to the learning application 300. In some embodiments, the tool compatibility is received from and updated by the learning application authoring user 104 by accessing the tool database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility in the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g. Electric Guitar attached to a user device 140 during an 'Introduction to Hard Rock' learning application) the Tool Metadata includes the compatibility to the user device 140. In other embodiments, wherein the learning material is not material to the user device 140, (e.g. Sulphuric Acid during a Chemistry Experiment) the Tool Metadata may not include any additional user device compatibility.

The Mode Metadata 324 is used to receive, store, retrieve, display and update the available modes of performance of the learning application. In some embodiments, the mode metadata is determined by the modes chosen by the learning content application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g. four learners) cooperative performance mode, a limited plurality of learners (e.g. four learners) competitive performance mode, a tutor plus limited plurality of learners (e.g. nine learners) cooperative performance mode (a typical classroom mode). Although the Mode Metadata is described as being composed of various available modes as chosen by the learning application authoring user, various other modes (e.g. a limited plurality of learners vs. a limited plurality of learners competitive performance mode) may comprise the Mode Metadata 324 and still fall within the scope of various embodiments. In some embodiments, the various Media Metadata for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata is also used to determine purchase compatibility in the microlearning purchase management module 238 through learning application database 204 and to determine performance compatibility in the microlearning performance management module 240 through learning application database 204.

The Media Metadata 326 is used to receive, store, retrieve, display and update text, image, audio, video, animation, links and other interactive elements of the learning content application as received and updated by the learning application authoring user 104 during the publishing and revision of the learning content application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is used to receive, store, retrieve, display and update the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is used to receive, store, retrieve, display and update the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is used to receive, store, retrieve, display and update the potential errors which can be made by the learning user 102 (e.g. Ten potential errors in an auditing microlearning application), as determined by the learning application authoring user 104. In some embodiments, wherein the learning application (e.g. a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g. a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is used to receive, store, retrieve, display and update the default script, formatting and media modules of the learning application template used to author the learning application 300. In some embodiments, wherein a particular sequence and format of the same has been chosen by the learning content application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g. for Praxis Tasks in Dance Applications) as a reference point. Although the Template Metadata is described as being composed of various available templates as developed by the learning application template authoring user and chosen by the learning application authoring user, various other templates (e.g. a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is used to receive, store, retrieve, display and update the compatibility of tutoring users to learning content application. In some embodiments, the tutoring user compatibility is received from and updated by the tutoring user 112 by updating the tutor database 208 (e.g. a Mathematics Tutoring User whose medium of instruction is Mandarin updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata is also used to determine purchase compatibility in the microlearning purchase management module 238 through learning application database 204 and to determine performance compatibility in the microlearning performance management module 240 through learning application database 204.

In various embodiments, the metadata of learning application 300 is retrieved, displayed to and updated by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g. Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
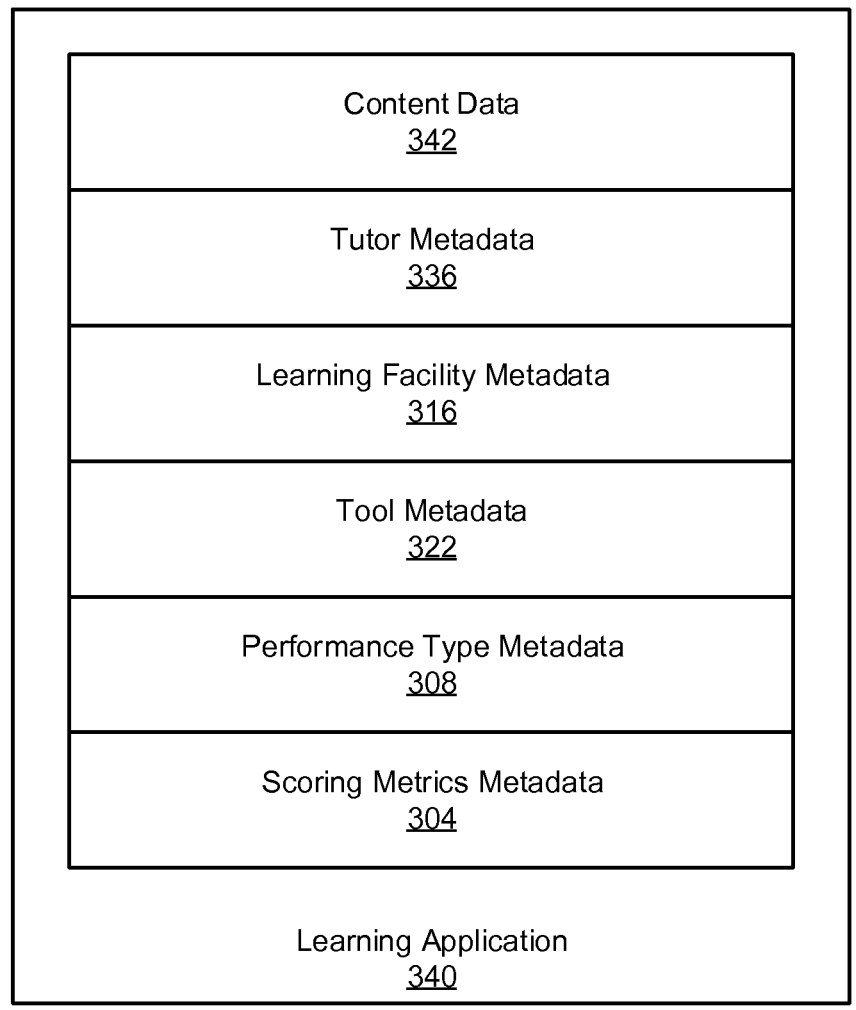
FIG. 3B is a block diagram of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata is stored as well. The tutor metadata, learning facility metadata, learning tool metadata and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
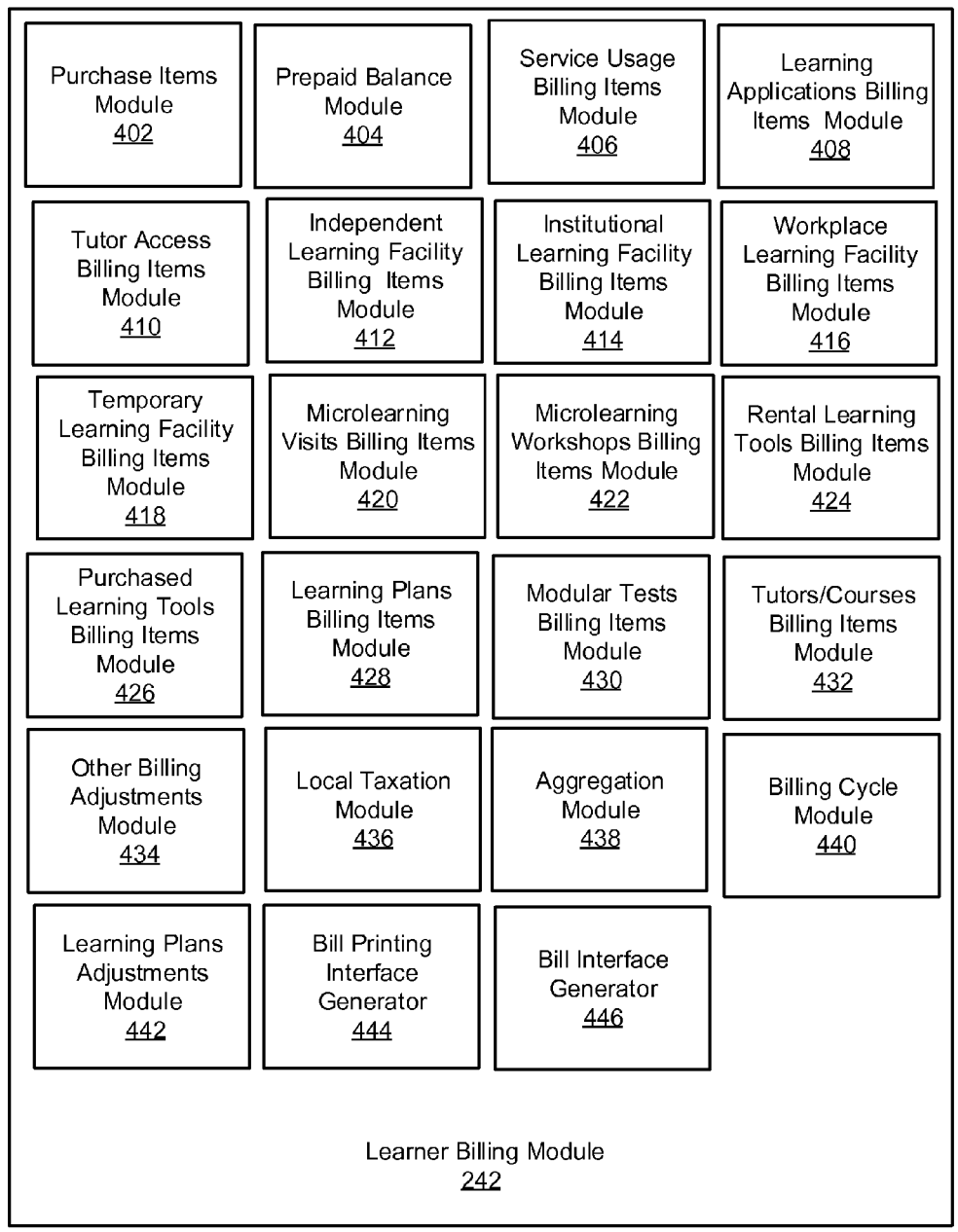
FIG. 4 is a block diagram of a learner billing module according to an embodiment.

FIG. 4 is a block diagram of the learner billing module 242 according to one embodiment. The purchase items module 402 is configured for receiving, storing, retrieving and updating a plurality of purchase items generated by microlearning purchase management module 238 during the purchase of a plurality of learning applications, application services and learning events by each learning user in user database 202 of the modular learning system 144. In some embodiments, wherein the purchase transaction is processed by the payment processing module in microlearning purchase management module 238 before the generation of the learner bill for the period, the purchase and corresponding purchase items are received from microlearning purchase management module 238 and then accessed by the corresponding billing items modules to generate the learner bill. In other embodiments, wherein the learner bill is generated before the payment is processed for the purchase items, the module and the corresponding billing item may be generated by the corresponding module in the learner billing module 242, and then accessed by the microlearning purchase management module 238 to generate the unique purchase item for each billing item at the time of processing the bill payment which is then received and stored as a purchase item or a plurality of purchase items in purchase items module 402.

The prepaid balance module 404 is configured for receiving, storing, retrieving and updating a plurality of prepaid account balances for some or all of the plurality of learning users in user database 202 of the modular learning system 144. In some embodiments, wherein the prepaid account balance is insufficient to make a payment for the learning application, application service, microlearning event or even service usage of the system 144, the microlearning purchase management module 238 does not process the payment transaction through the prepaid account balance and the corresponding billing items may not be generated and stored in the corresponding billing items module of learner billing module 242 until that time. In some embodiments, the balance may be displayed with the corresponding prepaid account balance items and refill history of the learning user for each billing cycle in the prepaid account balance cell on the printed learner bill and, optionally, on the learner bill interface generated by bill interface generator 446 on learning user 102's user device 140.

The service usage billing items module 406 is configured for generating, storing, retrieving and updating a plurality of service usage billing items for each unique service usage purchase item generated or required to be generated by microlearning purchase management module 238 and billed to the corresponding learning user, say learning user 102, in database 202 of the modular learning system 140. In some embodiments, each service usage billing item billed to learning user in each billing cycle may be printed or, optionally, displayed to the learning user in the service usage billing item cell generated and printed or displayed by bill printing interface generator 444 or bill interface generator 446 on paper or on the learning user 102's user device 140, with a plurality of data fields like an item code, item code of the corresponding learning applications, transaction date and time, rate in the preferred currency, number of units of time or quantity and the total amount or cost billed for the item for the billing cycle.

The learning applications billing items module 408 is configured for generating, storing, retrieving and updating a plurality of learning application billing items for each unique learning application purchase item generated or required to be generated by microlearning purchase management module 238 and billed to the corresponding learning user, say learning user 102, in database 202 of the modular learning system 140. In some embodiments, each learning application billing item billed to learning user in each billing cycle may be printed or, optionally, displayed to the learning user in the learning application billing item cell generated and printed or displayed by bill printing interface generator 444 or bill interface generator 446 on paper or on the learning user 102's user device 140, with a plurality of data fields like an item code, item code of the corresponding learning applications, transaction data and time, rate in the preferred currency, and the total amount or cost billed for the item for the billing cycle.

The tutor access billing items module 410 is configured for generating, storing, retrieving and updating a plurality of tutor access billing items for each unique tutor access purchase item generated or required to be generated by microlearning purchase management module 238 and billed to the corresponding learning user. In some embodiments, each tutor access billing item billed to learning user in each billing cycle may be printed or, optionally, displayed to the learning user in the tutor access billing item cell generated and printed or displayed by bill printing interface generator 444 or bill interface generator 446 on paper or on the learning user 102's user device 140, with a plurality of data fields like an item code, item code of the corresponding learning applications, transaction date, login time, logout time, duration of tutor access, rate in the preferred currency and the total amount billed for the item for the billing cycle.

The independent learning facility billing items module 412 is configured for generating, storing, retrieving and updating a plurality of independent learning facility billing items for each unique independent learning facility access purchase item generated or required to be generated by microlearning purchase management module 238 and billed to the corresponding learning user. In some embodiments, each independent learning facility billing item billed to learning user in each billing cycle may be printed or, optionally, displayed to the learning user in the independent learning facility access billing item cell generated and printed or displayed by bill printing interface generator 444 or bill interface generator 446 on paper or on the learning user 102's user device 140, with a plurality of data fields like an item code, item code of the corresponding learning applications, transaction date, check-in time, checkout time, duration of independent facility access, rate in the preferred currency and the total amount billed for the item for the billing cycle.

The institutional learning facility billing items module 414 is configured for generating, storing, retrieving and updating a plurality of institutional learning facility billing items for each unique institutional learning facility access purchase item generated or required to be generated by microlearning purchase management module 238 and billed to the corresponding learning user. In some embodiments, each institutional learning facility billing item billed to learning user in each billing cycle may be printed or, optionally, displayed to the learning user in the institutional learning facility access billing item cell generated and printed or displayed by bill printing interface generator 444 or bill interface generator 446 on paper or on the learning user 102's user device 140, with a plurality of data fields like an item code, item code of the corresponding learning applications, transaction date, check-in time, checkout time, duration of institutional learning facility access, rate in the preferred currency and the total amount billed for the item for the billing cycle.

The workspace learning facility billing items module 416 is configured for generating, storing, retrieving and updating a plurality of workspace learning facility billing items for each unique workspace learning facility access purchase item generated or required to be generated by microlearning purchase management module 238 and billed to the corresponding learning user. In some embodiments, each workspace learning facility billing item billed to learning user in each billing cycle may be printed or, optionally, displayed to the learning user in the workspace learning facility access billing item cell generated and printed or displayed by bill printing interface generator 444 or bill interface generator 446 on paper or on the learning user 102's user device 140, with a plurality of data fields like an item code, item code of the corresponding learning applications, transaction date, check-in time, checkout time, duration of workspace learning facility access, rate in the preferred currency and the total amount billed for the item for the billing cycle.

The temporary learning facility billing items module 418 is configured for generating, storing, retrieving and updating a plurality of temporary learning facility billing items for each unique temporary learning facility access purchase item generated or required to be generated by microlearning purchase management module 238 and billed to the corresponding learning user. In some embodiments, each temporary learning facility billing item billed to learning user in each billing cycle may be printed or, optionally, displayed to the learning user in the temporary learning facility access billing item cell generated and printed or displayed by bill printing interface generator 444 or bill interface generator 446 on paper or on the learning user 102's user device 140, with a plurality of data fields like an item code, item code of the corresponding learning applications, transaction date, check-in time, checkout time, duration of temporary learning facility access, rate in the preferred currency and the total amount billed for the item for the billing cycle.

The microlearning visits billing items module 420 is configured for generating, storing, retrieving and updating a plurality of microlearning visits billing items for each unique microlearning visits purchase item generated or required to be generated by microlearning purchase management module 238 and billed to the corresponding learning user, say learning user 102, in database 202 of the modular learning system 140. In some embodiments, each learning visits billing item billed to the learning user in each billing cycle may be printed or, optionally, displayed to the learning user in the learning visits billing item cell generated and printed or displayed by bill printing interface generator 444 or bill interface generator 446 on paper or on the learning user 102's user device 140, with a plurality of data fields like an item code, item code of the corresponding learning applications, rate in the preferred currency, number of units of time or quantity and the total amount billed for the item for the billing cycle.

The microlearning workshops billing items module 422 is configured for generating, storing, retrieving and updating a plurality of learning workshops billing items for each unique learning workshops purchase item generated or required to be generated by microlearning purchase management module 238 and billed to the corresponding learning user. In some embodiments, each learning workshops billing item billed to learning user in each billing cycle may be printed or, optionally, displayed to the learning user in the learning workshops billing item cell generated and printed or displayed by bill printing interface generator 444 or bill interface generator 446 on paper or on the learning user 102's user device 140, with a plurality of data fields like an item code, item code of the corresponding learning applications, rate in the preferred currency, number of units of time or quantity and the total amount billed for the item for the billing cycle.

The rental learning tools billing items module 424 is configured for generating, storing, retrieving and updating a plurality of learning tools rental billing items for each unique learning tool rental purchase item generated or required to be generated by microlearning purchase management module 238 and billed to the corresponding learning user. In some embodiments, each learning tool rental billing item billed to learning user in each billing cycle may be printed or, optionally, displayed to the learning user in the learning tools rental billing item cell generated and printed or displayed by bill printing interface generator 444 or bill interface generator 446 on paper or on the learning user 102's user device 140, with a plurality of data fields like an item code, item code of the corresponding learning applications, transaction date, duration of tool access, rate in the preferred currency and the total amount billed for the item for the billing cycle.

The purchased learning tools billing items module 426 is configured for generating, storing, retrieving and updating a plurality of learning tools sales billing items for each unique learning tools sales purchase item generated or required to be generated by microlearning purchase management module 238 and billed to the corresponding learning user. In some embodiments, each learning tools sales billing item billed to learning user in each billing cycle may be printed or, optionally, displayed to the learning user in the learning tools sales billing item cell generated and printed or displayed by bill printing interface generator 444 or bill interface generator 446 on paper or on the learning user 102's user device 140, with a plurality of data fields like an item code, item code of the corresponding learning applications, rate in the preferred currency, number of units or quantity and the total amount billed for the item for the billing cycle.

The learning plans billing items module 428 is configured for generating, storing, retrieving and updating a plurality of learning plans billing items for each unique learning plan purchase item generated or required to be generated by microlearning purchase management module 238 and billed to the corresponding learning user. In some embodiments, each learning plans billing item billed to learning user in each billing cycle may be printed or, optionally, displayed to the learning user in the learning plans billing item cell generated and printed or displayed by bill printing interface generator 444 or bill interface generator 446 on paper or on the learning user 102's user device 140, with a plurality of data fields like an item code, item code of the corresponding learning applications, rate in the preferred currency, number of units of time or quantity and the total amount billed for the item for the billing cycle.

The modular tests billing items module 430 is configured for generating, storing, retrieving and updating a plurality of modular tests billing items for each unique modular tests purchase item generated or required to be generated by microlearning purchase management module 238 and billed to the corresponding learning user. In some embodiments, each modular tests billing item billed to learning user in each billing cycle may be printed or, optionally, displayed to the learning user in the modular tests billing item cell generated and printed or displayed by bill printing interface generator 444 or bill interface generator 446 on paper or on the learning user 102's user device 140, with a plurality of data fields like an item code, item code of the learning application whose performance is tested, transaction date and time, rate in the preferred currency, number of units of time or quantity and the total amount billed for the item for the billing cycle.

The tutorials/courses billing items module 432 is configured for generating, storing, retrieving and updating a plurality of tutorials/courses billing items for each unique tutorial/course purchase item generated or required to be generated by microlearning purchase management module 238 and billed to the corresponding learning user. In some embodiments, each tutorial/course billing item billed to learning user in each billing cycle may be printed or, optionally, displayed to the learning user in the tutorials/courses billing item cell generated and printed or displayed by bill printing interface generator 444 or bill interface generator 446 on paper or on the learning user 102's user device 140, with a plurality of data fields like an item code, item code of the corresponding learning applications, rate in the preferred currency, number of units of time or quantity and the total amount billed for the item for the billing cycle.

The other billing adjustments module 434 is configured for determining the adjusted aggregate amount to be billed to the learning user 102 in a given billing cycle using one or a plurality of adjustment items stored by the modular learning system 144 for the learning user 102 or plurality of learning users from database 202 billed in a given billing cycle by the billing module 242. In some embodiments, the adjustment item may increase the adjusted aggregate bill amount and in other embodiments, the adjustment item may decrease the adjusted aggregate billed amount. In embodiments, wherein one or a plurality of tutorial, course or a learning plan adjustment items are used to adjust the aggregate bill amount of the user 102 or each such user in database 202 in a given billing cycle, the other billing adjustments item or plurality of items are adjusted by module 434 after the above adjustments are made by module 442 in the billing module 242. For example, a tutor access billing item preferred to be purchased and paid for by a given learning user 102 through the prepaid account balance of user 102 in module 404 or compatible to be funded by the fund balance received by the learning user 102 from the user's funding user 122, may decrease the net amount due from the learning user 102, with the module 434 computing the adjustment and storing the adjustment items and corresponding data fields to be printed for or displayed to the learning user 102 in print or on user 102's user device 140 by the corresponding bill generator.

The local taxation module 436 is configured for receiving, storing, retrieving and updating a plurality of local taxation items to compute one of the pluralities of taxes and levies imposed on the adjusted aggregate amount billed to each learning user 102 in each billing cycle. The subset local taxation items applicable to each learning user 102 may be stored against each learning user 102's corresponding identity items in module 436, by accessing the same from the larger plurality of local taxation items for each tax region of the world present in the database of module 436. In some embodiments, the local taxation items applicable to the learning user 102 may be determined by accessing the location identity items of each learning user 102 from user database 202 of the modular learning system 144. In some embodiments, the module 436 computes the applicable local taxation items and stores the applicable local taxation items with the corresponding amounts to be printed for or displayed to the learning user 102 in print or on user 102's user device 140 by the corresponding bill generator. In other words, cost of microlearning items is determined based on a tax rate applicable to each microlearning item.

The aggregation module 438 is configured for aggregating a plurality of billed amounts of each kind of billing item for each learning user 102 in a given billing cycle and generate corresponding aggregate amount item for the kind of billing item to be printed or displayed at the bottom of each cell generated for the kind of billing item and printed or displayed to each learning user 102 in print or on user 102's user device 140. Further the aggregation module 438 is used to aggregate the amounts generated above into a total amount billed to each learning user 102 in a given billing cycle, generate a corresponding total billed amount item to be printed or displayed in the bill summary of the learner bill in print or on user 102's user device 140 using a billing generator. In some embodiments, the aggregation module 438 may be further used to aggregate tutorial, course or learning plan adjustment or, other billing adjustments as well as local taxation items and generate the corresponding aggregate items to be printed or displayed at the bottom of the corresponding cells by the generator 444 or 446 in print or on user 102's user device 140.

The billing cycle module 440 is configured for receiving, storing, retrieving and updating a billing cycle item with a plurality of particulars like the start date in the month, the end date of the month, the duration as well as a plurality of other particulars for each learning user 102 in database 202 of the modular learning system 144. In various embodiments, the module determines the subset of the plurality of billing items generated for each learning user 102 which are billable in a given billing cycle and requests the bill printing interface generator 444 and the bill interface generator 446 to print or display the updated learner bill for or to each learning user 102 at a predetermined date and time before the end of the next billing cycle. In some embodiments, the billing cycle and corresponding particulars are chosen or filled in input areas of a preferred billing cycle interface by learning user 102 on learning user 102's user device 140 before the beginning of the first billing cycle, while in other embodiments, the billing cycle of each learning user 102 may be determined by the modular learning system 144 or, optionally, at random by the billing cycle module 440 itself.

The learning plans adjustments module 442 is configured for determining the adjusted aggregate amount items to be billed to each learning user in a learner billing cycle based on a learning plan activated by learning user 102 during the billing cycle or in any prior billing cycle, with the corresponding billing item generated by module 428 and billed to the learning user 102 in the billing cycle or any previous billing cycles. In some embodiments, wherein a learning plan billing item is generated for a learning plan sold to the learning user 102 indicating purchase of one or a plurality of learning applications, application services or even service usage, with a single purchase item generated with a single purchase amount for the plurality of kinds of billing items, the adjustments module 442 deducts the price of each such learning application, learning application service, microlearning event and, optionally, the service usage from the aggregate amount billed to the learning user 102 when the learning user 102 accesses the learning application, application service, microlearning event or service usage within the given billing cycle. In some embodiments, the billing items within a particular learning plan may be deducted by module 442 over a plurality of billing cycles in case one or more of the billing items are accessed and billed to the learning user 102 in a plurality of billing cycles. In some embodiments, the module 442 may further adjust and deduct amounts for a plurality of microlearning events like microlearning workshops, microlearning visits and tutorial/courses containing a plurality of other billing items and already purchased as a single purchase item each by learning user 102, across on or a plurality of billing cycles from the aggregate amount for the billing cycle or a plurality of billing cycles as and when the learning application, application service or service usage is accessed and billed to the learning user 102 on or through the modular learning system 144.

The bill printing interface generator 444 generates the interface for the administrator of the modular learning system 144 to view and print the learner bill of each learning user 102 in database 202 with the corresponding cells and billing items billable to each such learning user 102 in a given billing cycle. The interface generator 444 receives an interface generation and printing request from billing cycle module 440 on a predetermined date and time during each billing cycle for each learning user 102 and generator 444 generates the interface with a corresponding 'Print Bill' interface item to be confirmed through an input by the administrator of modular learning system 144 on the administrator's user device. In some embodiments, generator 444 may include preference settings entered in by the administrator of modular learning system 144 to automatically print a plurality of learner bills on a given schedule based on the billing cycles of the plurality of learning users, and generator 444 may request the printing device connected to the administrator's user device to print the learner bills automatically in phases at predetermined intervals of time.

The bill interface generator 446 is configured for generating a plurality of interface items for each unique billing item billed to each learning user 102 by accessing the same from a plurality of billing item modules in the billing module 242 and, optionally, generates a plurality of interface items for each adjustment item, local taxation item and aggregation item as well as, optionally, each prepaid account balance item by accessing the corresponding items from a plurality of corresponding modules in billing module 242. The generator 446 then generates an account summary cell as well as a plurality of cells for each kind of billing interface item and other items and displays the plurality of cells through the learner billing interface to each learning user 102 in database 202 of the modular learning system 144 on each such user 102's user device 140. In some embodiments, the learner bill interface may be displayed upon a request made by the learning user 102 while accessing the learning management interface on a user device 140, with the interface updated to the point of the last billing cycle and corresponding printed bill. In other embodiments, the generator 446 may, upon receiving a learner bill display request from any learning user 102, access the plurality of billing, adjustment, taxation, aggregation and prepaid balance items from the plurality of modules in module 242, immediately generate the corresponding interface items and cells for the same and display the learner bill based on billing items within the billing cycle to the learning user 102 at any point of time during a given billing cycle on such user 102's user device 140.

Although the learner billing module is described as being composed of various modules, fewer or more modules (e.g. Learning User Module, Learning Application Module, Service Usage Timing Module, Billing Timing Item Module, and Learning Event Adjustments Module) may comprise the module with the present invention still falling within the scope of various embodiments.

FIG. 5 is the learner bill interface 500 generated by the learner billing module 242. The bill printing interface generator 444 or, optionally, the bill interface generator 446 generates a plurality of interface items and cells for printing or display to each learning user, say learning user 102, in print or on user 102's user device 140. The billing items and corresponding cells and data fields for the billing items 504, 506, 508, 510,512, 514, 516 and 518 are generated by accessing the corresponding billing items from modules 408, 410, one, some or all of 412, 414, 416 or 418, one, some or all of 420, 422 or 432, 424, 426, 430 and 428 respectively and generating corresponding interface items for the same. Further, the generator 444 or, optionally, 446 may access aggregation items for each cell and kind of billing item from module 438 and generate corresponding aggregate items in each of the cells. Further, the generator 444 or, optionally, 446 may access the learning plan adjustments, other adjustments 522 and taxes and levies 524 items from the corresponding modules 442, 434 and 436 and generate interface items for the same. Further, the generator 444 or, optionally, 446 accesses the final total adjusted bill amount 526 for the learning user 102 for the aid billing cycle from module 436 or, optionally, 440 and generates a corresponding total amount interface item. In some embodiments, the billing items timing module may be further accessed by generator 444 or, optionally, 446 to retrieve the start time, end time and duration data fields of a plurality of billing items in modules 406, 410, 412, 414, 416, 418 and 424 and generate corresponding interface items in the corresponding data fields of cells 518, 506, 508 and 512. The generated interface items and corresponding cells are printed or displayed for or to learning user 102 by generator 444 or, optionally 446 in print or on user 102's user device 140.

Figure 6:
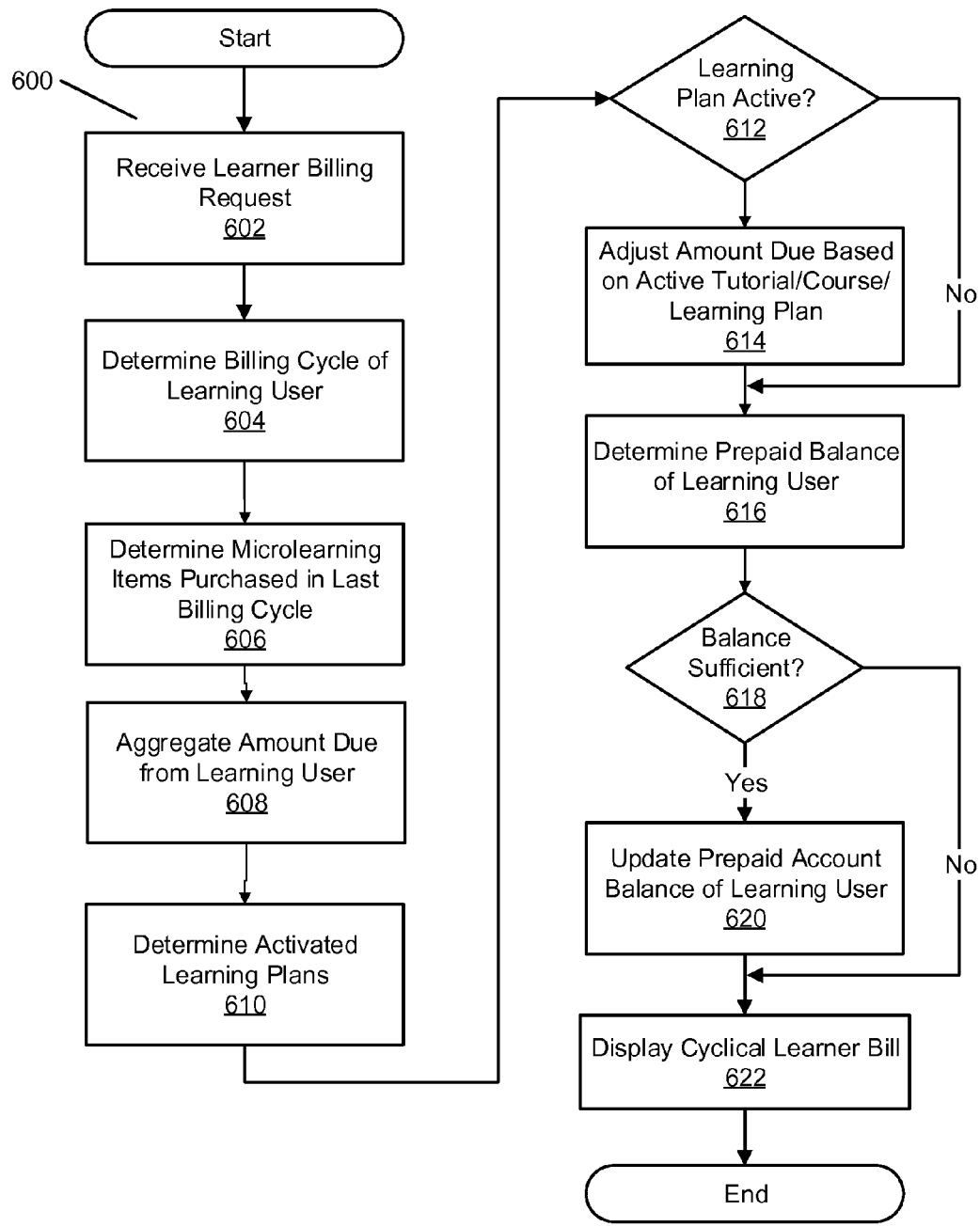
FIG. 6 is a flow diagram of the method for learner billing in a modular learning system environment according to one embodiment.

FIG. 6 is a flow diagram 600 of a computer-implemented method for learner billing in a modular learning system according to one embodiment. At step 602, the bill printing interface 444 or, optionally, the bill interface generator 446 receives a learner billing request for a learning user, say user 102 from billing cycle module 440. At step 604, the billing cycle module 440 retrieves the billing cycle item and corresponding particulars for the learning user 102 from the corresponding items and particulars stored for the plurality of learning users on the modular learning system 144. For example, the module 440 may determine that the billing cycle of user 102 is one billing month from the fifteenth of every calendar month to the fourteenth of the next calendar month. At step 606, the aggregation module 438 receives the date and duration particulars from module 440 and retrieves the billing items generated for the learning user 102 in the most recent unbilled billing cycle from a plurality of billing items modules.

Step 608 comprises aggregating costs of microlearning items. At step 608, the aggregation module then aggregates a plurality of billing microlearning items from each module separately and generates aggregation items for each kind of billing microlearning item billed at least once in the most recent unbilled billing cycle. Further, the aggregation module 438 aggregates each generated aggregation item into a total aggregation item for the total amount billed to the user 102 in the most recent unbilled billing cycle. In an embodiment the cost of microlearning items is determined based on a number of times a learning application was performed, a rate per hour and tax rate applicable to the microlearning item. At step 610, the billing cycle module 440 requests the learning plan adjustments module 442 to determine adjustments to the total aggregate amount generated by module 438 based on active learning plan specifying microlearning items pre-purchased by the learning user 102 during the most recent unbilled billing cycle.

At step 612, the learning plans adjustments module 442 accesses the learning plans billing items module 428 for determining active learning plans and, optionally, the purchase items module 402 to determine activated learning plans during the most recent unbilled billing cycle of the learning user 102. In embodiments wherein no learning plan is active, or wherein any active learning plan or plurality of plans are not relevant to at least one billing item billed to the learning user in the most recent unbilled billing cycle, the module 442 confirms the same with billing cycle module 440 which directly proceeds to determine the prepaid account balance of the learning user 102 by accessing the same from module 404.

At step 614, in embodiments wherein a learning plan or a plurality of learning plans are active, and at least one billing item billed to the learning user 102 in the billing cycle is present in the learning plan, the learning plans adjustments module 442 retrieves the total aggregate amount from aggregation module 438 and reduces the same by the billed price of the billing item or a plurality of billing items, since the billing item has already been billed as part of a corresponding learning plan billing item to the learning user 102 in the most recent unbilled billing cycle, or, optionally, billed to and purchased the learning user 102 in a previous billing cycle. The module 442 then generates an adjusted total aggregate amount to be billed to the learning user for the most recent unbilled billing cycle and generates corresponding learning plan adjustment items or a plurality of items for each corresponding adjusted billing item or plurality of billing items and stores the same for future access by generators 444 and 446 in module 242. In some embodiments, in case of a microlearning event adjustment, a corresponding learning event adjustments module may perform the adjustments and generate the adjusted total billed amount and corresponding microlearning event adjustment item or plurality of items by accessing microlearning event billing modules like modules 432, 422 and 420 and, optionally, the purchase items module 402 as well.

At step 616, when no learning plan is active or, optionally, the adjustments module 442 has generated and stored an adjusted total billed amount for the learning user 102 in the billing cycle, the billing cycle module 440 may access the prepaid account balance of the learning user 102 in module 404 to determine the prepaid account balance of the learning user 102. In embodiments, wherein the adjustments module 434 makes further adjustments to the adjusted total billed amount generated by module 442 or, optionally, to the total billed amount generated by module 438, the revised bill amount is accessed by the local taxation module 436 and increased by the local taxation levied on each billing item billed to the learning user in the most recent unbilled billing cycle. In such embodiments, the billing cycle module 440 retrieves the final adjusted total billed amount from the local taxation module 436 and then proceeds to access the prepaid account balance of the learning user 102 from module 404.

At step 618, the module 440 compares the prepaid account balance of the learning user 102 with the final adjusted total bill amount retrieved from module 436 and determines whether the prepaid balance is greater than or equal to the billed amount. At step 620, when the prepaid account balance is greater than or equal to the billed amount, based on the billing preferences of the learning user 102, the module 440 updates the prepaid account balance of the learning user 102 in module 404 by reducing the same by the final adjusted total bill amount retrieved from module 436 and module 404 generates an updated prepaid account balance item to be accessed by generators 444 and, optionally, 446 while generating the prepaid account balance cell in the learning user 102's printed or displayed learner bill or learner bill interface.

At step 622, when the prepaid account balance of learning user 102 is less than the final adjusted total bill amount retrieved from module 436, or in embodiments, wherein the prepaid account balance of the learning user 102 is reduced by the amount and updated in the module 404, the billing cycle module 440 requests the billing printing interface generator 444 or, optionally, the bill interface generator 446 to retrieve the corresponding items from the plurality of modules in module 242 and display or print the cyclical learner bill for the most recent unbilled billing cycle, for the learning user 102. The applicable billing generator retrieves the items, generate the corresponding interface items and cells and print or display the same for the learning user 102.

Although the method for learner billing in a modular learning system environment is described as being composed of various steps, fewer or more steps (e.g. Deduct Local Taxation Levies for Learning User) may comprise the method with the present invention still falling within the scope of various embodiments.

Computing Machine Architecture

Figure 7:
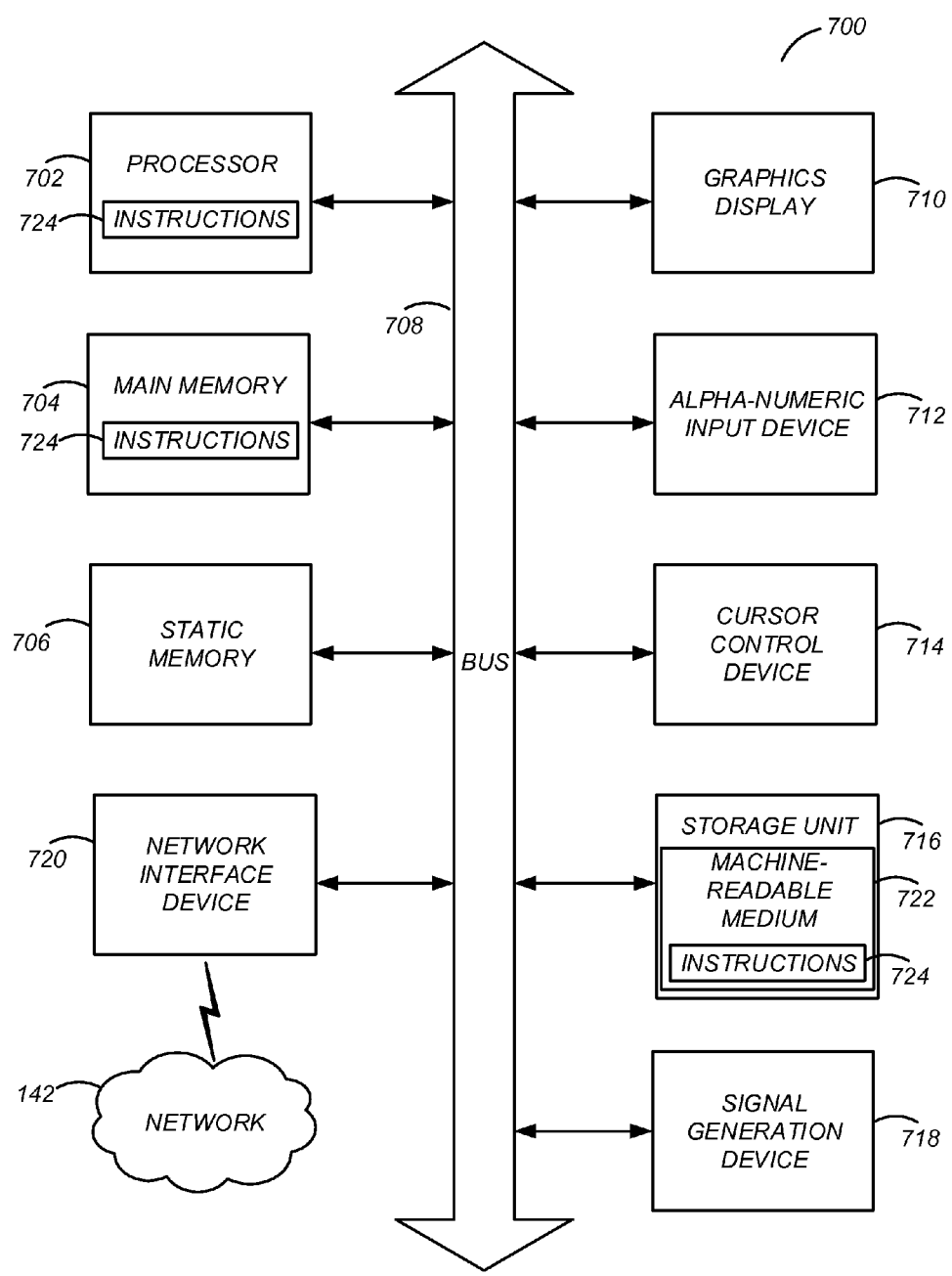
FIG. 7 illustrates modules of an example machine able to read instructions from a machine-readable medium and execute them in a processor (or controller) according to one embodiment.

FIG. 7 is a block diagram illustrating modules of an example machine suitable for use as a modular learning system 144, in which any of the embodiments disclosed herein may be performed, according to one embodiment. This example machine is able to read instructions from a machine-readable medium and execute them in a processor (or controller).

Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 142 via the network interface device 720.

While machine readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 702 may be a microprocessor, a state machine, an application specific integrated circuit, a field programmable gate array, etc. (e.g., Intel® Pentium® processor). The main memory 704 may be a dynamic random access memory and/or a primary memory of the modular learning system 144. The static memory 706 may be a hard drive, a flash drive, and/or other memory information associated with the modular learning system 144.

The bus 708 may be an interconnection between various circuits and/or structures of the modular learning system 144. The video display 710 may provide graphical representation of information on the modular learning system 144. The alphanumeric input device 712 may be a keypad, keyboard and/or any other input device. The cursor control device 714 may be a pointing device such as a mouse.

The storage unit 716 may be a hard drive, a storage system, and/or other longer term storage subsystem. The signal generation device 718 may be a bios and/or a functional operating system of the modular learning system 144. The network interface device 720 may be a device that may perform interface functions such as code conversion, protocol conversion and/or buffering required for communication to and from a network (e.g., the network 142 of FIG. 1). The machine readable medium 722 may provide instructions 724 on which any of the methods disclosed herein may be performed. The instructions 724 may provide source code and/or data code to the processor 702 to enable any one/or more operations disclosed herein. For example, the modular learning system 144 may be stored in the form of instructions 724 on a storage medium such as the main memory 704 and/or the machine readable medium 722 such as compact disk.

In one embodiment, a non-transitory computer-readable storage medium having a program executable by a computing device (e.g. the modular learning system 144) causes the computing device to perform method steps illustrated in FIG. 6.

Additional Configuration Considerations

As such, users are provided learner billing systems providing a consolidated cyclical bill of the services provided to a learning user. As such, the bill provides a consolidated view of a variety of events. In one embodiment, the billing module identifies related billing items from an individual learning service provider. For example, a learner who attends a learning facility for sequential hours of learning applications may incur several hours of individual learning facility billed hours associated with each learning application. The billing module identifies the learning facility access as sequential activities and consolidates the facility billing activity as a single billing item. Moreover, once the information is consolidated, the billing module can be configured to communicate with a learning application recommendation module to provide recommendations of other courses available to the learner at the facility and provide learning packages, for example, for additional courses that can be offered at a discount at the facility.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of components, modules, or mechanisms, for example, as illustrated in FIGS. 2, 4, and 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3 G telecommunications network, a 4 G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 7, various methods and electric structures may be embodied using transistors, logic gates, and electrical circuits (e.g., Application Specific Integrated Circuitry and/or in Digital Signal Processor circuitry). For example, the purchase management module 238, performance management module 240 and other modules of FIGS. 1 to 5 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g., a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for enabling learner billing of time-limited access to one or more learning content modules, one or more time-limited tangible tutoring services, time-limited access to one or more tangible learning facilities, or time-limited access to one or more learning tools in a learning system, the learning system including one or more processors and a plurality of user computing devices, the plurality of user computing devices being remotely linked over a computer network through a network interface device configured to perform functions enabling communication to and from the computer network via a mobile or browser-based web application, a computer desktop application, an electronic module or subsystem of a social networking environment, an electronic learning content management system, a professional networking environment, an electronic commerce system, an electronic payments system, or an Internet-based website, each of the plurality of user computing devices including an electronic user interface and an electronic display, the one or more processors configured with one or more computer-implemented modules or generators including a learner billing module, a billing cycle module, a microlearning purchase management module, a performance management module, an aggregation module, a learning plans adjustments module, a billing adjustments module, a service usage timing module, a prepaid balance module, and a bill interface generator, at least one of the one or more modules or generators including at least one learning database with learning data arranged in data fields, the method comprising steps of:

- displaying a time-limited access control interface on the electronic display of a user computing device of a learning user through the network interface device, the time-limited access control interface including an option to purchase microlearning items each associated with a pre-determined billable usage value per unit of time including time-limited access to at least one learning content module, the learning content module comprising instructional content and associated electronic media related to the instructional content or at least one of the plurality of metadata associated with the learning system, or time-limited access to at least one tangible tutoring service, or time-limited access to at least one tangible learning facility, or time-limited access to at least one tangible learning tool;
- accepting a selection from the learning user associated with the user computing device via the electronic user interface for time-limited access to least one learning content module or time-limited access to at least one tangible tutoring service or time-limited access to at least one tangible learning facility or time-limited access to at least one tangible learning tool via the network interface device;
- granting time-limited access to at least one learning content module or time-limited access to at least one tangible tutoring service or time-limited access to at least one tangible learning facility or time-limited access to at least one tangible learning tool via an electronic access control interface on the user computing device associated with at least one learning user or at least one tutoring user or at least one learning facility administering user via a performance management module at multiple dates and times, and recording the duration, dates, and times of all time-limited accesses as a variety of access events;
- monitoring, via the service usage timing module, via an electronic access control interface on the user computing device associated with at least one of the learning user, tutoring user, or learning facility administering user, time-limited access by the learning user to at least one learning content module, to at least one tangible tutoring service, to at least one tangible learning facility, or to at least one tangible learning tool, at different dates and times, and recording the duration, dates, and times of each time-limited access as a variety of billable usage events;
- receiving, via the bill interface generator, a billing cycle completion reminder from the billing cycle module at a predetermined time after the completion of a user billing cycle;
- receiving, via the bill interface generator, an electronic bill generation request for at least one time-limited access event or at least one time-limited billable usage event from the billing cycle module for the completed billing cycle;
- determining, via the microlearning purchase management module, a plurality of microlearning items purchased by the learning user in the billing cycle, the plurality of microlearning items including time-limited access to at least one learning content module, or time-limited access to at least one tangible tutoring service, or time-limited access to at least one tangible learning facility, or time-limited access to at least one tangible learning tool being included in the learning data and retrieved from respective data fields of the learning database;
- determining, via the microlearning purchase management module, a pre-determined billable usage value per unit of time for the purchased or accessed microlearning items including time-limited access to at least one learning content module, or time-limited access to at least one tangible tutoring service, or time-limited access to at least one tangible learning facility, or time-limited access to at least one tangible learning tool, wherein the unit of time includes at least one of seconds, or minutes, or hours or days,
- computing, by the aggregation module, pro-rated billable usage values of microlearning items accessed by the learning user in the completed billing cycle to determine the aggregate pro-rated billable usage value due from the learning user, wherein the computing includes consolidating the variety of learning content module access events as a first consolidated billing item and the variety of billable usage events as a second consolidated billing item;
- determining, by the billing cycle module, if a prepaid value is previously associated with the learning user;
- determining, by the prepaid balance module, the prepaid value and balance pro-rated billable usage value after adjustment of prepaid value against aggregate billable usage value for the completed billing cycle; and
- displaying, by the bill interface generator, an electronic learner bill designating at least one of an itemized or aggregate a zero or non-zero balance pro-rated billable usage value on the electronic display of the user computing device operated by the learning user, the balance pro-rated billable usage value being based on the first consolidated billing item and the second consolidated billing items, and any adjustments by the billing adjustments module to the balance pro-rated billable usage value due.

2. The computer-implemented method of claim 1, wherein the cost of microlearning items is determined based on a number of times a learning content module was performed.

3. The computer-implemented method of claim 1, wherein the cost of microlearning items is determined based on a rate per hour.

4. The computer-implemented method of claim 1, wherein the cost of microlearning items is determined based on a tax rate applicable to the microlearning items.

5. The computer-implemented method of claim 1, wherein computing the costs of microlearning items purchased by the learning user may further include determination, by the learning plans adjustments module, active learning plans purchased by the learning user in the billing cycle, and an active learning plan specifying microlearning items pre-purchased by the learning user, the method further comprising:

- responsive to determining that the learning user purchased an active learning plan in the billing cycle, adjusting, by the billing adjustments module, the amount due based on the microlearning item or items already billed or pre-purchased by the learning user for the active learning plan.

6. The computer-implemented method of claim 1, wherein the displaying of the electronic learner bill designating the remaining balance further comprises:

displaying, by a learning content module recommendation module, a recommendation of a different learning content module in the learning system available to the learning user at the learning facility used by the learning user in performance of the learning content module.

7. The computer-implemented method of claim 1, wherein the displaying of the electronic learner bill designating the balance pro-rated billable usage value further comprises:

sending, by the bill interface generator, at regular predetermined intervals, an electronic learner bill as an electronic mail or electronic mail attachment to the electronic mail address provided by the learning user and present in the learning database.

8. The computer-implemented method of claim 1, wherein the displaying of the electronic learner bill designating the balance pro-rated billable usage value further comprises:

sending, by the bill interface generator, at regular predetermined intervals, an electronic learner bill or bill summary in text format as a text message to the mobile number provided by the learning user and present in the learning database.

9. The computer-implemented method of claim 1, wherein the displaying of the electronic learner bill designating the balance pro-rated billable usage value further comprises:

sending, by the bill interface generator, at regular predetermined intervals, an electronic learner bill notification or bill summary in text format as a web based browser notification or mobile application notification to the user computing of the learning user.

10. The computer-implemented method of claim 1, wherein the microlearning items of time-limited access to one or more learning content modules, time-limited access to one or more time-limited tangible tutoring services, time-limited access to one or more tangible learning facilities, or time-limited access to one or more learning tools further comprise predetermined units of access time in increments of minutes or hours accessible by a learning user in a single uninterrupted access event or billing usage event without prorated billing.

* * * * *